(12) United States Patent
Higashikata et al.

(10) Patent No.: US 7,012,714 B2
(45) Date of Patent: Mar. 14, 2006

(54) COLOR PROCESSING METHOD, AND SYSTEM WITH COVERAGE RESTRICTION

(75) Inventors: Ryosuke Higashikata, Nakai-machi (JP); Hiroaki Ikegami, Nakai-machi (JP); Makoto Sasaki, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 953 days.

(21) Appl. No.: 09/838,266

(22) Filed: Apr. 20, 2001

(65) Prior Publication Data

US 2001/0035968 A1    Nov. 1, 2001

(30) Foreign Application Priority Data

Apr. 21, 2000 (JP) .............................. 2000-120432
Feb. 13, 2001 (JP) .............................. 2001-034867

(51) Int. Cl.
H04N 1/46 (2006.01)
G06K 15/00 (2006.01)

(52) U.S. Cl. .......................... 358/1.9; 358/529; 358/2.1

(58) Field of Classification Search ................ 345/427, 345/601, 602, 603, 604; 382/167, 162; 358/518, 358/519, 520, 521, 522, 523, 591, 529, 1.9, 358/2.1, 504, 515, 530
See application file for complete search history.

(56) References Cited

U.S. PATENT DOCUMENTS 5,978,011 A * 11/1999 Jacob et al. ................ 347/251
5,987,168 A * 11/1999 Decker et al. .............. 382/167

FOREIGN PATENT DOCUMENTS

| JP | 5-292306 | 11/1993 |
|----|----------|---------|
| JP | 6-242523 | 9/1994 |
| JP | 10-262157 | 9/1998 |

OTHER PUBLICATIONS

Po-Chieh Hung, "Colorimetric Calibration for High Quality Color Printers," pp. 147-150.

* cited by examiner

*Primary Examiner*—Jerome Grant, II
(74) *Attorney, Agent, or Firm*—Morgan, Lewis & Bockius LLP

(57) ABSTRACT

The invention provides a color processing method that is capable of improving the color reproduction accuracy by calculating an adequate amount of black component (referred to as K) with consideration of the coverage restriction when a four-color signal including the black component is generated from a color signal of a input color space. By a YMCK modeling unit, adjustment K calculation unit, restriction K calculation unit and optimal K modeling unit, modeling is performed between the representative color signal and the corresponding optimal K by use of plural color signals that belong to the partial color space, namely the color gamut that is reproducible with three colors and by use of plural color signals that belong to the area on the curved plane that is reproducible with four colors including the black component as the representative color signal. An optimal K determining unit predicts an optimal K corresponding to the input color signal in the input color space based on the model. Furthermore, a YMCK color signal calculation unit predicts three colors except the black component from the input color signal and the predicted optimal K. As described hereinabove, a four-color signal including K is generated.

33 Claims, 12 Drawing Sheets

COLOR PROCESSING METHOD, AND SYSTEM WITH COVERAGE RESTRICTION

BACKGROUND OF THE INVENTION

1. Field of the Invention

This invention relates to a color processing method and a color processing apparatus for transforming the color signal in the color space such as L*a*b*, and RGB to the color signal of four colors including black, and relates to a recording medium that stores a program for implementing such color processing method, and an image marking apparatus on which such a color processing apparatus is mounted.

2. Description of the Related Art

When a color image is color-printed by means of xerography, four-color printing by yellow (Y), magenta (M), cyan (C), and black (K) is used usually. On the other hand, the general color signal is the color signal on the three-dimensional color space such as L*a*b*, L*u*v* color spaces that are independent of the device or RGB color space that is used for display signal. Therefore, when a color image is to be color-printed, the color signal on the three-dimensional color space must be transformed to the four-dimensional color space. However, because the transformation is performed between different dimensions, one-to-one relation is not held, and there exist plural combinations of the color signal on the three-dimensional color space and the four-color signal for reproducing the color signal on the three-dimensional color space. Hereinafter, the amounts of yellow, magenta, cyan and black components are referred to as Y, M, C and K, respectively.

To determine the combination of the color signal on the three-dimensional color space and the color signal on the four-dimensional color space, there have been known a method in which Y, M, and C are calculated, the under color is removed, and K is added, and also a method in which K is determined at first by a certain method and Y, M, and C are then determined corresponding to K. Recently, the latter method has been used popularly in view of the excellent color reproduction, and other various methods are tried.

For example, in the method described in Japanese Published Unexamined Patent Application No. Hei 5-292306, at first, an achromatic K for reproducing the input color signal under the condition of Y=0%, M=0%, or C=0% is weighted as set previously, and a new K is determined. Based on the new K, Y, M, and C are determined so as to reproduce the input color signal. Thereby, it is possible to control K corresponding to the purpose and it is also possible to implement high accuracy color reproduction simultaneously.

Furthermore, in the method described in Japanese Published Unexamined Patent Application No. Hei 6-242523, at first, a maximum K of the four-color signal that reproduces the input color signal under the condition of Y=0%, M=0%, C=0%, or K=100% is calculated. Then, the minimum K of the four-color signal that reproduces the input color signal under the condition of Y=100%, M=100%, C=100%, or K=0% is calculated. Thereafter, a new K is determined by use of a parameter that has been set on the intermediate point between the maximum K and the minimum K calculated as described above, and Y, M, and C that reproduces the input color signal is determined based on the new K. Thereby, the four-color gamut that is a reproducible color gamut with four colors including black can be used ultimately.

A coverage restriction is imposed to general output devices. The coverage restriction means the upper limit on the total amount of recording material such as toner or ink that is used to reproduce the color signal. The coverage restriction is applied to prevent the reduced reproducibility or high impasto print due to excessive use of recording material such as toner or ink, or to protect an output device.

However, the above-mentioned conventional methods do not consider the coverage restriction. Therefore, when K is controlled according to the parameter that has been previously set, the reproduction could not be implemented though that is in the reproducible color gamut. In other words, because the calculated Y, M, C, and K is outside the range of from 0% to 100%, the color gamut compression is caused resultantly, and the color reproduction accuracy becomes poor.

FIG. 14 is a graph for describing an example of the relation between the lightness and K in the conventional method. FIG. 14 shows K at the color different in the lightness with a certain chroma and hue. In FIG. 14, the abscissa represents L* (lightness) and the ordinate represents K, and an exemplary locus of the maximum K to L* and an exemplary locus of the minimum K are shown with a bold solid line and a bold broken line respectively. At that time, in the case of the method described in Japanese Published Unexamined Patent Application No. Hei 6-242523, K can be controlled in the range enclosed by a bold solid line and a bold broken line. In this example, the lightness range of $L^* \geq B$ is given as the color reproduction area.

However, usually the coverage restriction is applied inevitably. In FIG. 14, the border lightness that is reproducible with four colors and satisfies the coverage restriction is shown with a fine line parallel to the ordinate (L*=A). Because of the coverage restriction as described hereinabove, Y, M, and C are outside the range of from 0% to 100% in the case where the K in the hatched range is used, and the reproduction becomes impossible. In particular, though the $L^*a^*b^*(L^* \geq A)$ in the hatched range is reproducible correctly, the reproduction is impossible because K is not determined properly.

Furthermore, the portion where the total coverage (sum of Y, M, C and K) is largest locates on the lower periphery for both lightness and chroma in the three-color gamut that is reproducible color gamut with three colors except black, and it is likely that the total coverage on the periphery exceeds the coverage restriction. However, in the case where Y, M, and C are replaced with K to satisfy the coverage restriction, the proper K cannot be calculated by the conventional method.

The present invention has been accomplished in view of the above-mentioned problem, and provides a color processing method and a color processing apparatus that are capable of calculating a proper K with consideration of the coverage restriction to thereby improve the color reproduction accuracy when the four-color signal including the black component is generated from the input color signal in the input color space, and are capable of controlling the preferable K correspondingly to the lightness, chroma, and hue by controlling K by use of the parameter that has been set previously, provides a recording medium that stores a program or the like for implementing such a color processing method, and provides an image marking apparatus on which such a color processing apparatus is mounted.

SUMMARY OF THE INVENTION

In a color processing method of the present invention used for generating a four-color signal including a black component, which reproduces the color signal, from an arbitrary color signal in a input color space, K is determined so as to satisfy the coverage restriction and so as to maximize the color gamut, and furthermore, K corresponding to the representative color signals on the curved plane that satisfies the coverage restriction and uses the color gamut to the maximum is determined, and any K is determined by use of K corresponding to the representative color signals.

For example, plural pairs of representative color signal that belong to a partial color space that is a reproducible color gamut with three colors and the corresponding optimal K as well as plural pairs of representative color signal that belong on the curved plane that is reproducible with four colors including black and satisfies the coverage restriction and the corresponding optimal K are generated, the optimal K corresponding to the color signal in the input color space is predicted based on a model generated from plural pairs of the representative color signal in the input color space and the optimal K corresponding to the representative color signal, and three colors except the black component are predicted from the predicted optimal K and the input color signal to thereby calculate a four-color signal including the black component. At that time, as the plural pairs of representative color signals that belong to the partial color space and the corresponding optimal K, plural pairs of representative color signals that belong on the periphery of the partial color space and the corresponding optimal K that satisfies the coverage restriction can be included, and additional one or plural pairs of the representative color signal and the optimal K that satisfies the coverage restriction corresponding to the representative color signal can be included.

For example, plural pairs of the representative color signals that belong to a partial color space that is a reproducible color gamut with three colors and the corresponding optimal K that satisfies the coverage restriction as well as plural pairs of the representative color signal that belong on the curved plane that is reproducible with four colors including black and satisfies the coverage restriction and the corresponding optimal K are generated, the optimal K corresponding to the color signal in the input color space is predicted based on a model generated from plural pairs of the representative color signal in the input color space and the optimal K corresponding to the representative color signal, and three colors except black component is predicted from the predicted optimal K and the input color signal to thereby calculate a four-color signal including the black component.

The present invention provides the color processing method as described above, and furthermore provides a color processing apparatus that is used for implementing such a color processing method, and a computer-readable recording medium that stores a program that is run on a computer to execute such color processing method.

Because the optimal K is determined based on the model generated with consideration of the coverage restriction in the present invention, failure of color reproduction due to coverage restriction and needless color compression are prevented, and the color is reproduced correctly.

The curved plane that is served for selection of the representative color signal is the outermost periphery surface of the four-color gamut that satisfies the coverage restriction. To obtain the representative color signal on such outermost periphery surface, search is carried out on a semi-line that extends in the high chroma direction or the low lightness direction, or the high chroma and low lightness direction from the starting point of the color signal in the input color space in the color gamut that is reproducible with three colors or on the periphery of the color gamut that is reproducible with three colors.

Furthermore, the partial color space that is the reproducible color gamut with three colors may be a three-color gamut or may be the achromatic color gamut that is reproducible color gamut with combination of three colors from four colors including black.

Furthermore, the optimal K corresponding to the representative color signal that belongs on the curved plane may be the maximum K that indicates K that maximizes K out of one or more four-color signals that reproduce the representative color signal, or may be K obtained by clipping the achromatic K corresponding to the representative color signal in a range from 0% to 100%.

The optimal K corresponding to the representative color signal that belongs to the partial color space may be K obtained by multiplying the achromatic K corresponding to the representative color signal by a K control parameter that depends on at least any one of, for example, lightness, chroma, and hue depending on the representative color signal. At that time, in the case of the representative color signal in the partial color space or the representative color signal on the periphery of the partial color signal that likely exceeds the coverage restriction, the optimal K may be adjusted by searching between the optimal K that has been given at first and the achromatic K so that the total of Y, M and C generated from the optimal K corresponding to the representative color signal satisfies the coverage restriction.

The maximum K is the achromatic K if the representative color signal is reproducible with the four-color signal including the achromatic K clipped at 0% and 100%, and on the other hand if the representative color signal is not reproducible with the four-color signal including the achromatic K clipped at 0% and 100%, the maximum K is calculated by calculating the minimum K from the representative color signal and thereafter by searching between the minimum K and 100%. At that time, the minimum K is calculated by repeating prediction of the three colors until both two colors except black predicted from the representative color signal become a value equal to 100% or smaller under the condition that one of the three colors except black of the four-color signal is equalized to 100% successively and thereafter by clipping K predicted at the time point when the predicted two colors except black become a value equal to 100% or smaller in a range from 0% to 100%.

Furthermore, the achromatic K is calculated by repeating prediction of the residual three colors until both two colors except black predicted from the representative color signal become a value equal to 0% or bigger under the condition that one of the three colors except black of the four-color signal is equalized to 0 successively in the order of the higher extent of unwanted color, and thereafter by clipping K predicted at the time point when the predicted two colors except black become a value equal to 0% or bigger in a range from 0% to 100%.

By use of the above-mentioned color processing method, plural four-color signals obtained on the condition that plural representative color signals in the input color space is used as the input color signal is correlated to the input color signal to generate a multi-dimensional look up table (MDLUT), and an arbitrary color signal in the input color space is color-transformed to the four-color signal by use of the MDLUT. Otherwise, similarly, plural representative color signals in the input color space are used as the input color signal, a coefficient that is used for color transformation of a color input image is generated from the correlative relation between the obtained four-color signal and the input color signal, and an arbitrary color signal in the input color space is color-transformed to a four-color signal by use of the coefficient. Furthermore, the present invention provides a recording medium that stores the MDLUT and coefficient that are generated as described hereinbefore. Furthermore, the present invention provides a color processing apparatus that is used for color transformation based on such a MDLUT or a coefficient, and also an image marking apparatus having such a color processing apparatus.

BRIEF DESCRIPTION OF THE DRAWINGS

Preferred embodiments of the present invention will be described in detail based on the followings, wherein.

DETAILED DESCRIPTION OF PREFERRED EMBODIMENTS

Figure 1:
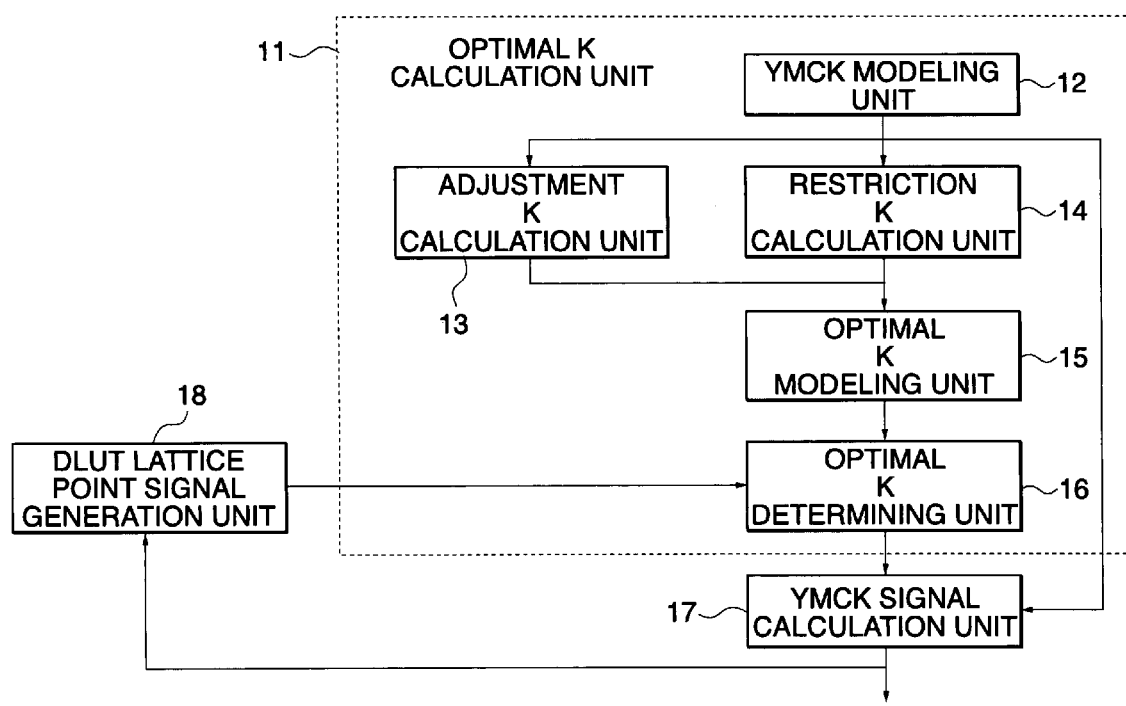
FIG. 1 is a block diagram illustrating the first embodiment of the present invention.

FIG. 1 is a block diagram illustrating the first embodiment of the present invention. In FIG. 1, 11 denotes an optimal K calculation unit, 12 denotes a YMCK modeling unit, 13 denotes an adjustment K calculation unit, 14 denotes a restriction K calculation unit, 15 denotes a optimal K modeling unit, 16 denotes an optimal K determining unit, 17 denotes a YMCK signal calculation unit, and 18 denotes a MDLUT generation unit. In this embodiment, the case in which the input color space is CIELAB (L*a*b*) color space and the four-color signal includes Y, M, C, and K will be described. However, the present invention is by no means limited to this case of the color space and the four-color signal, but can be also applied to other color spaces such as CIELUV (L*u*v*) and RGB and other four-color signal including K.

The optimal K calculation unit 11 predicts the optimal K for the color signal in the input color space (L*a*b* color space) based on the model generated from plural pairs of the representative color signal in the input color space and the optimal K corresponding to the representative color signal. As the representative color signal used at that time, not only plural color signals that belong to the partial color space that is the reproducible color gamut with three colors but also plural color signals that belong to the curved plane that is reproducible with four colors including black and satisfies the coverage restriction are used. The optimal K calculation unit 11 is composed of the YMCK modeling unit 12, the adjustment K calculation unit 13, the restriction K calculation unit 14, the optimal K modeling unit 15, and the optimal K determining unit 16.

The YMCK modeling unit 12 models an output device in the input color space by an arbitrary method. As the modeling method, for example, neural net, or weighted average method may be used. As a matter of course, any method may be used as long as a model that is capable of predicting residual three values from any four values out of Y, M, C, K, L*, a*, and b* is derived. In the present example, the method described in Japanese Published Unexamined Patent Application No. Hei 10-262157 is used. In the YMCK modeling unit 12, plural color patches with the suitable combinations of Y, M, C, and K are printed, and the color patches are actually measured to obtain the value of L*, a*, and b*, and plural pairs of the YMCK value and the L*a*b* value are generated.

The adjustment K calculation unit 13 selects plural L*a*b* in the three-color gamut, and calculates the achromatic K from the selected L*a*b*, and calculates the adjustment K by multiplying the achromatic K by the K control parameter that has been previously set correspondingly to the L*a*b*. Herein, the achromatic K means K in the case where unwanted color is zero.

Figure 2:
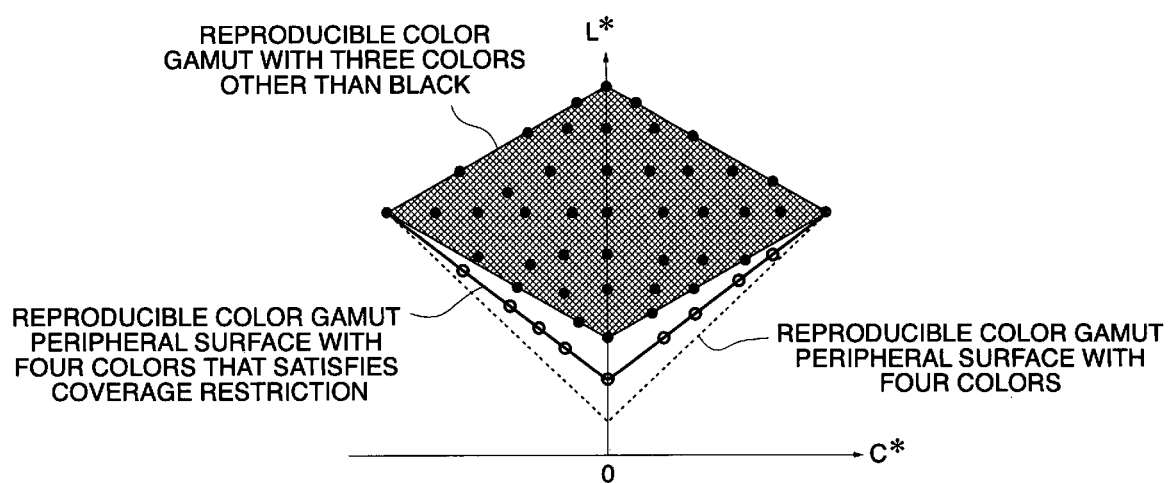
FIG. 2 is an explanatory diagram illustrating an exemplary L*a*b* value used for calculation of the optimal K in the first embodiment of the present invention.

FIG. 2 is an explanatory diagram for describing an exemplary L*a*b* value used for calculation of the optimal K in the first embodiment of the present invention. In FIG. 2, a L*–C* plane is shown in L*a*b* color space. In this plane, the partial area that is reproducible with Y, M, C, and K is limited. Particularly in FIG. 2, the three-color gamut (partial area) is hatched. The adjustment K calculation unit 13 selects plural L*a*b* in the hatched color gamut and calculates the adjustment K. In FIG. 2, the selected L*a*b* is marked with black circles. Other symbols will be described hereinafter.

In the present example, $(n+1)^3$ L*a*b* values are predicted from $(n+1)^3$ YMCK (K is always equal to 0) values that are lattice points formed by dividing each axis of the YMC color space by use of the YMCK-LAB model generated by the YMCK modeling unit 12, and the predicted plural L*a*b* values are selected.

Figure 3:
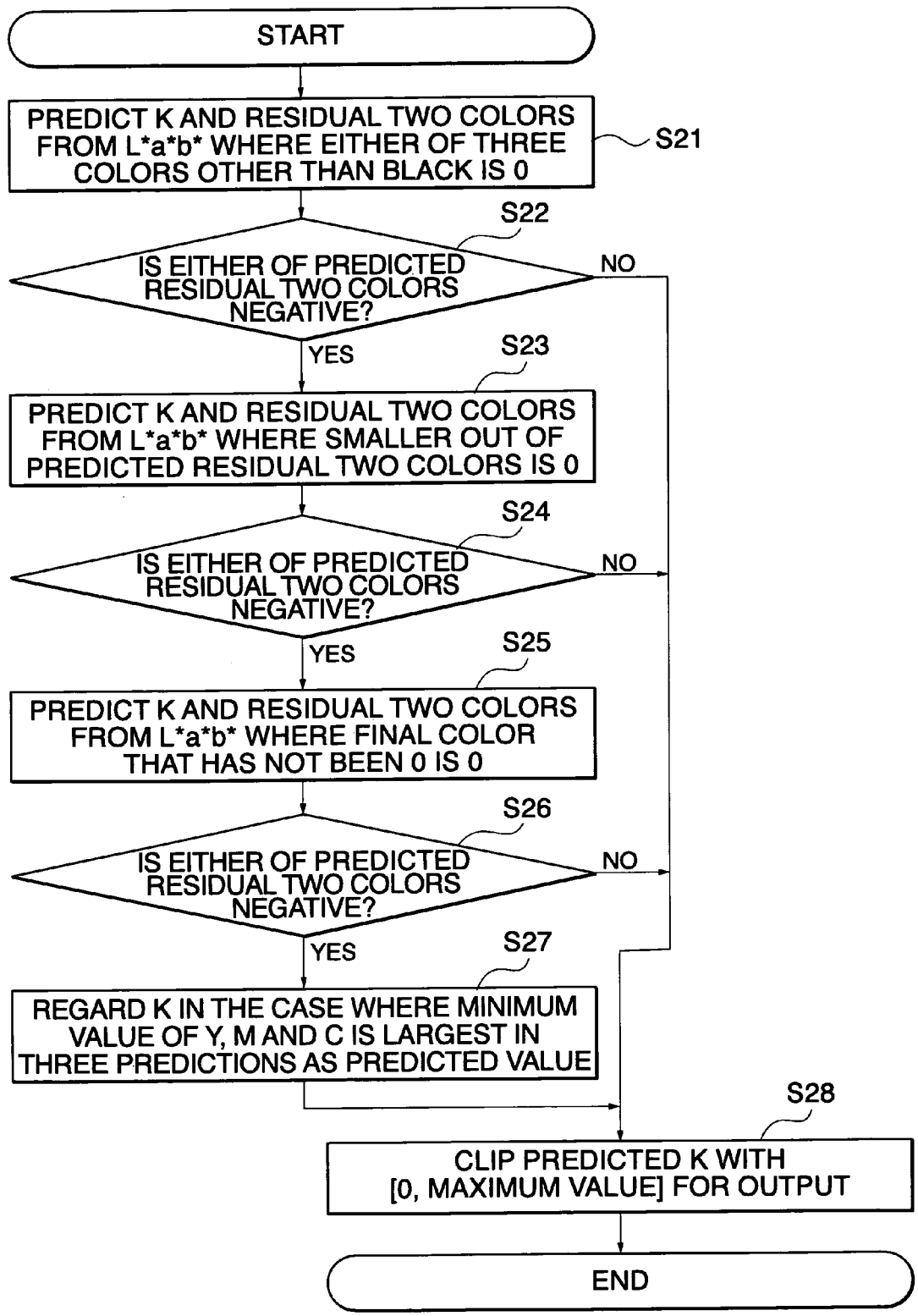
FIG. 3 is a flowchart for describing exemplary processing for calculating the achromatic K from the L*a*b*.

FIG. 3 is a flowchart for describing an exemplary processing for calculating the achromatic K from L*a*b*. At first, in S21, any of YMC except K is equalized to 0, and K and residual two colors are predicted from L*a*b*. Any one of YMC that is equalized to 0 may be selected arbitrarily, however, in the case where calculation operation load is to be reduced as much as possible, the color that is likely the unwanted color is preferably equalized to 0 selectively. Herein, Y is selected at first for the purpose of description. Therefore, M, C, and K are predicted from Y=0, L*, a*, and b*. M, C, and K are predicted by use of the YMCK-LAB model that have been generated by means of the YMCK modeling unit 12.

Next, in S22, whether or not any of the predicted residual two colors, namely M and C in this case, is negative is checked. The possible result that the predicted result of other colors except K is smaller than the unwanted color under the condition of the unwanted color=0, namely a negative result, suggests that the color equalized to 0 is not the unwanted color. In S22, such a case is determined. If either of them is negative, the result suggests that the selected color is not the unwanted color. Therefore, in S23, any one color that is likely the unwanted color out of the predicted residual two colors M and C, namely the color that, is the smaller between M and C, is equalized to 0, and K and residual two colors are predicted from L*a*b*. Herein, M<C is assumed for the purpose of description. Therefore, Y, C, and K are predicted from M=0, L*, a*, and b*.

Similarly to the abovementioned case, this prediction result is tested to check whether or not any one of the predicted residual two colors, Y and C in this case, is negative in S24. If either of Y and C is negative, then the result suggests that the selected color is not the unwanted color. In this case, in S25, a color that has not be equalized to 0 except K is equalized to 0, and K and residual two colors are predicted from L*a*b*. Herein, Y, M, and K are predicted from C=0, L*a*b*.

Similarly to the abovementioned case, this prediction result is tested to check whether or not any one of the predicted residual tow colors is negative in S26. Because there is the unwanted color without exception, the residual two colors obtained in the third prediction result are expected not to be negative, however, either of them could be negative in some cases due to prediction error. In such a case, K in the case where minimum value of Y, M, and C is maximum among Y, M, C, and K obtained in three prediction operations is regarded as the correct prediction value.

In the case where neither of the residual two colors predicted in the condition determination is negative, or in the case where the predicted value that is considered to be correct with consideration of the prediction error is selected, the predicted K is K corresponding to the unwanted color=0. In S28, 0% is used for the case that K is negative, 100% is used for the case that K exceeds 100%, and thus the achromatic K is calculated.

The adjustment K calculation unit 13 calculates the adjustment K by multiplying the achromatic K calculated by means of the method shown in FIG. 3 by the K control parameter that depends on at least any one of the lightness, chroma, and hue to control K depending on the purpose. The K control parameter may be set previously in the form of a table depending on the purpose, or may be calculated occasionally by means of a function that receives L*a*b* as the input and generates the K control parameter as the output.

Because the selected L*a*b* belongs to the three-color gamut, the total color material amount is suppressed low and seldom exceeds the coverage restriction in the case where YMCK is generated by use of the adjustment K. However, in the case where the designated coverage restriction is a value smaller than 300% and the K control parameter is a value near 0%, the coverage restriction cannot be satisfied in some cases. In the case where such a problem is possible, processing in which YMCK is generated by use of the adjustment K for the selected L*a*b* and a test is carried out to check whether or not the coverage restriction is satisfied is added desirably. If the coverage restriction is not satisfied, then the selected L*a*b* may be excluded from the target.

As described hereinabove, L*a*b* in the three-color gamut is used in the present example, however, L*a*b* in the achromatic color gamut may be used. In general, because the achromatic color gamut is wider than the three-color gamut, the range of L*a*b* corresponding to K that is adjustable depending on the purpose is wider, and the color gamut is advantageous because the adjustment is more effective. On the other hand, the color gamut that is reproducible with three colors including black includes the color gamut that is not reproducible if K=0. Therefore, because the target L*a*b* is not reproducible with YMCK in the case where the adjustment K that is calculated with an extremely small K control parameter becomes very close to 0, the K control parameter must be set very carefully. As a matter of course, the three-color gamut is reproducible with K=0, and no problem occurs.

As described hereinabove, the adjustment K calculation unit 13 generates plural pairs of L*a*b* of the color gamut that is reproducible with three colors and the adjustment K that is controlled depending on the purpose corresponding to the L*a*b*.

The restriction K calculation unit 14 selects plural L*a*b* values on the periphery of the color gamut that is reproducible with four colors including black and satisfies the coverage restriction, and calculates plural pairs of the selected L*a*b* and corresponding maximum K. In FIG. 2, the periphery of the color gamut that is reproducible with four colors is shown with a broken line, and the periphery of the color gamut that satisfies the coverage restriction is shown with a bold solid line. The color gamut that is rendered reproducible by use of K is wider than the color gamut that is reproducible with only three colors shown with hatching. However, the color gamut that is enclosed by the bold solid line and the broken line out of the color gamut that is reproducible with four colors shown in FIG. 2 is not actually reproduced due to the coverage restriction, and that color gamut is the area where the color gamut compression occurs undesirably. The restriction K calculation unit 14 selects plural L*a*b* values on the periphery of the color gamut that satisfies the coverage restriction shown with the bold solid line in FIG. 2. The selected colors are shown with white circles.

Figure 4:
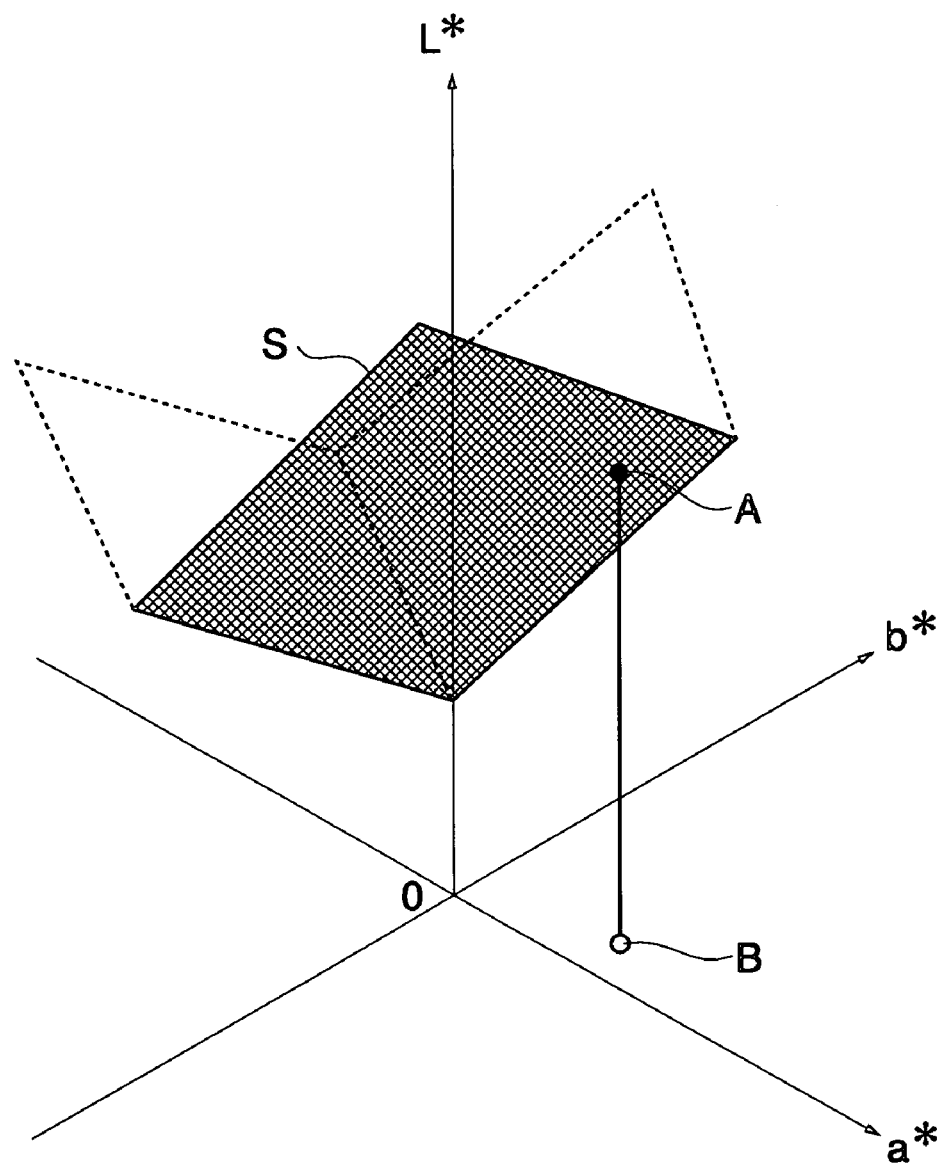
FIG. 4 is an explanatory diagram illustrating an exemplary selection method for selecting L*a*b* on periphery of the four-color gamut that satisfies the coverage restriction.

FIG. 4 is an explanatory diagram illustrating an exemplary selection method for selecting L*a*b* on the periphery of the four-color gamut that satisfies the coverage restriction. At first, a suitable L*a*b* that is on the color gamut peripheral surface S reproducible with three colors and is a three-dimensional color, which is shown with a black circle in FIG. 4, is calculated as an in-color gamut point A. For example, the in-color gamut point A is calculated by predicting the value of L*a*b* of YMCK (K is always 0) that satisfies the condition that none of the YMC is equal to 0 and at least any one of YMC is equal to 100% out of lattice points formed by dividing each axis in the YMC color space by n by use of the YMCK-LAB model generated by the YMCK modeling unit 12.

Because the in-color gamut point A calculated as described hereinabove belongs to the color gamut that is reproducible with three colors, in the case where YMCK is generated by use of the achromatic K, the total color material amount is suppressed low and seldom exceeds the coverage restriction. However, in the case where the designated coverage restriction value is an extremely low value, for example, approximately 200%, the total color material amount could fail to satisfy the coverage restriction. In the case where such a problem is likely to occur, it is desirable to additionally carry out the processing in which YMCK is generated by use of the achromatic K for the selected in-color gamut point to check whether the coverage restriction is satisfied or not. If the coverage restriction is not satisfied, the processing is interrupted if the processing cannot be continued, or L*a*b* that satisfies the coverage restriction is searched in the coverage decreasing direction (usually, high lightness and low chroma direction), and the in-color gamut point A is calculated.

Any method other than the abovementioned method may be used as long as the method satisfies the condition that the in-color gamut point A satisfies the coverage restriction and the point in the color gamut that is reproducible with four colors is calculated. For example, a method may be employed in which only L*a*b* that satisfies the abovementioned condition is selected from among L*a*b* values selected randomly.

Next, an out-color gamut point B shown with a white circle is set on FIG. 4. The out-color gamut point B is the color where L* of the in-color gamut point A is equalized to 0 in this example. Though L*=0 herein, the out-color gamut point B is the point that is not reproducible with four colors including black or the point that does not satisfy the coverage restriction. Anyway, the out-color gamut point B may be any point as long as the point is located so that the coverage increases (usually, low lightness and high chroma direction). Therefore, if the point of L*=0 is reproducible with four colors including black and likely satisfies the coverage restriction, for example, it is possible to set the L* negative. Furthermore, because it is preferable for binary search as described hereinafter that the out-color gamut point B is located near the corresponding in-color gamut point A in the L*a*b* space, the value of L* of the out-color gamut point B may be set to a suitable positive value depending on the chroma.

The binary search is carried out between the in-color gamut point A and the corresponding out-color gamut point B, the boundary L*a*b* that is reproducible with four colors including black and satisfies the coverage restriction is calculated. In general, the total color material amount of the combination of YMCK to which the maximum K is added is minimum. Based on this principle, the maximum K corresponding to the target L*a*b* is calculated in the binary search process, YMC is predicted from the maximum K and L*a*b*. If YMCK has a value in a range from 0% to 100% and the total sum of YMCK, namely the total color material amount, is equal to or smaller than the coverage restriction value, the result gives the point that is reproducible with four colors including black and satisfies the coverage restriction. If the YMCK is outside the range or the total color material amount is larger than the coverage restriction value, then the binary search is carried out again to search the satisfactory condition. If the result satisfies the condition, the obtained K is stored. As the result, L*a*b* on the periphery of the four-color gamut that satisfies the coverage restriction is selected. The maximum K that has been stored when the condition is satisfied in the processing of binary search is regarded as the restriction K corresponding to the L*a*b*.

The method in which binary search is carried out between the in-color gamut point A and the out-color gamut point B is used in the abovementioned example, however, any method may be used as long as the method is usable to calculate the boundary L*a*b* that is reproducible with four colors including black and satisfies the coverage restriction. For example, the point may be calculated by searching from the point of L*=0 to the point where YMCK has a value in a range from 0% to 100% with minimum color difference, and the total color material amount is within the coverage restriction value.

Figure 5:
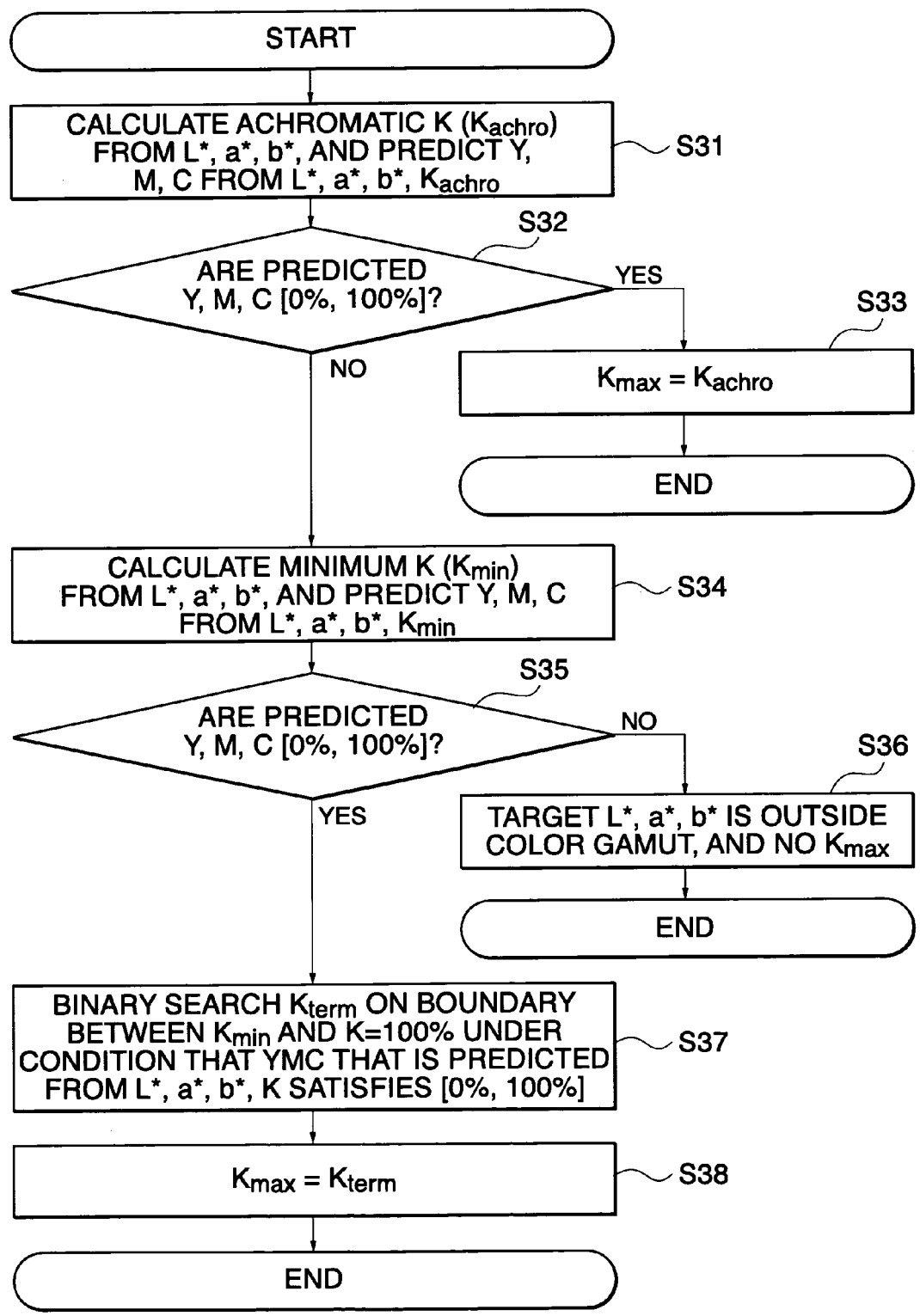
FIG. 5 is a flowchart for describing exemplary processing for calculating the optimal K from L*a*b* in the first embodiment of the present invention.

FIG. 5 is a flowchart for describing an exemplary processing for calculating the maximum K from L*a*b* in the first embodiment of the present invention. At first, in S31, the achromatic K ($K_{achro}$) is calculated from the L*a*b* to be processed by means of the method described with respect to FIG. 3. Then, Y, M, and C are predicted from L*a*b* and $K_{achro}$. The prediction is carried out using the YMCK-LAB model generated by the YMCK modeling unit 12.

Next, in S32, whether the YMC predicted in S31 are in a range from 0%, to 100% or not is checked. If the result is YES, then the calculated achromatic K is set as the maximum K ($K_{max}$) and the processing is brought to an end in S33.

If the result is NO, the minimum K ($K_{min}$) is calculated in S34 from the target L*a*b* by means of the method that will be described hereinafter with respect to FIG. 13. Then, Y, M, and C are predicted from L*a*b*, and $K_{min}$. The Y, M, and C are predicted by use of the YMCK-LAB model generated by the YMCK modeling unit 12.

Next, in S35, whether the YMC predicted in S34 is in a range from 0% to 100% or not is checked. If the check result is NO, then the target L*a*b* is not reproducible and $K_{max}$ does not exist. Therefore, the processing is brought to an end in S36 because the maximum K ($K_{max}$) does not exist.

If the check result is YES, then the maximum K ($K_{max}$) likely exists between the calculated minimum K ($K_{min}$) and K=100%. In S37, the maximum K ($K_{max}$) is searched between the minimum K ($K_{min}$) and K=100%. For example, YMC is predicted from the target L*a*b* and the $K_{term}$ selected between the minimum K ($K_{min}$) and K=100%, and the binary search is carried out under the condition whether the predicted YMC is in a range [0%, 100%] or not. The final $K_{term}$ obtained by repeating the binary search in S37 may be set as the maximum K ($K_{max}$) in S38. As described hereinabove, the desired maximum K ($K_{max}$) can be calculated.

Figure 6:
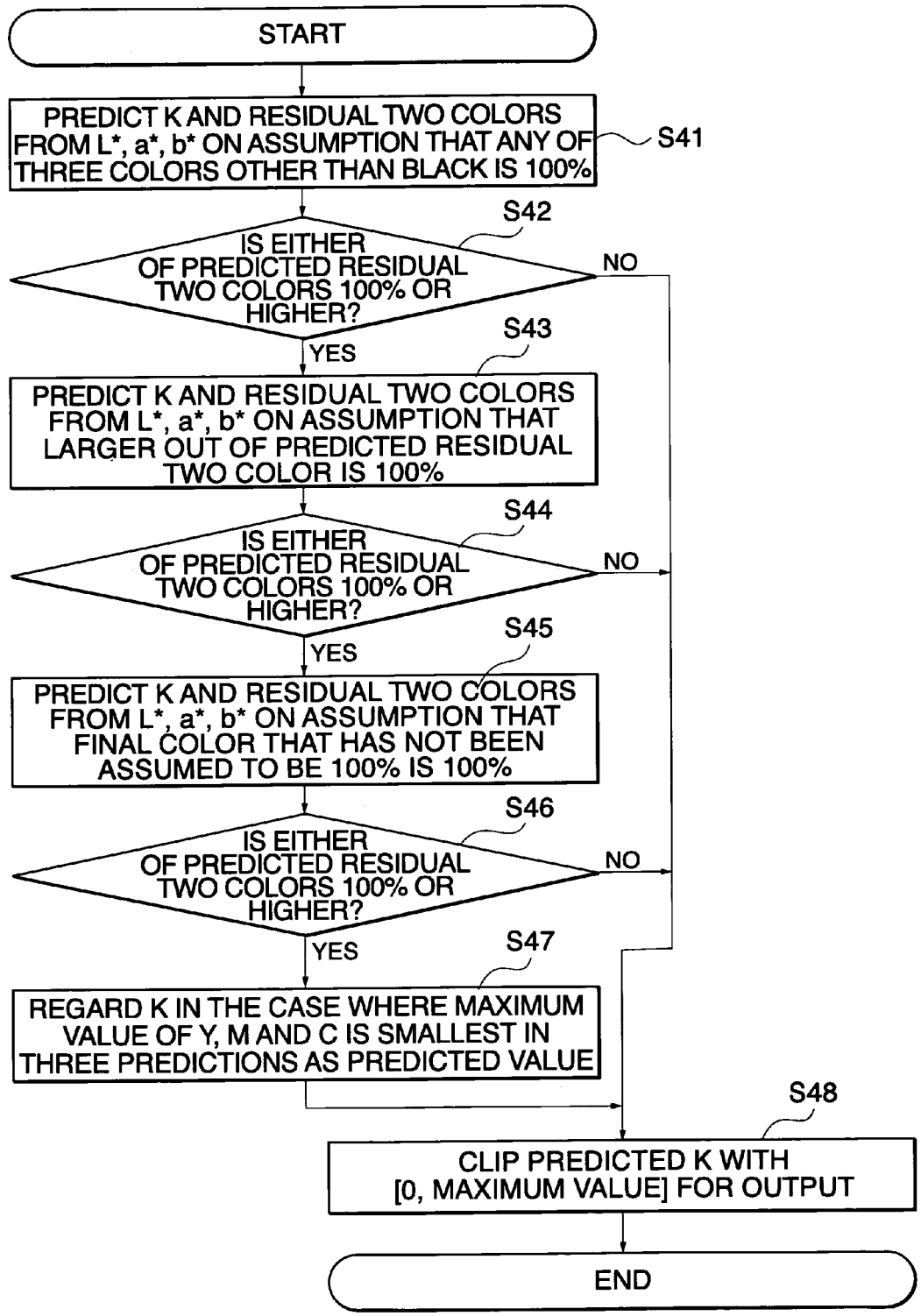
FIG. 6 is a flowchart for describing exemplary processing for calculating the minimum K from L*a*b* that is necessary in the process for calculating the maximum K in the first embodiment of the present invention.

FIG. 6 is a flowchart for describing an exemplary processing for calculating the minimum K from L*a*b* that is needed in the process for calculating the maximum K in the first embodiment of the present invention. The minimum K ($K_{min}$) is calculated in S34 shown in FIG. 5, and exemplary processing used at that time is shown in FIG. 6.

At first, in S41, K and residual two colors are predicted from L*a*b* under the assumption that any one of YMC except K is equalized to 100%. Though the selection of any one of YMC for 100% is arbitrary, however, to reduce the calculation work as much as possible, the color that is likely the wanted color out of the L*a*b* is equalized to 100% at first. Herein, Y is selected at first for the purpose of description. Therefore, M, C, and K are predicted from Y=100%, L*, a*, and b*. The prediction is carried out by means of the weighted liner regression by use of the YMCK-LAB model generated by the YMCK modeling unit 12.

Next, in S42, whether or not either of the residual two colors predicted in S41, namely either of M and C in this case, exceeds 100% is checked. Under the condition that the wanted color is equal to 100%, the prediction result of other colors except black is larger than that of the wanted color. In other words, the result that the prediction result exceeds 100% suggests that the color equalized to 100% is not the wanted color actually. In S42, whether the color that has been equalized to 100% is the wanted color or not is checked as described hereinabove.

If either of M and C exceeds 100%, then the selected color is not the wanted color. In this case, in S43, K and amounts of residual two colors are predicted from L*a*b* under the assumption that the color that is likely the wanted color out of the predicted residual two colors M and C, namely the larger out of M and C, is equalized to 100%. Herein, M>C is assumed for the purpose of description. Therefore, Y, C, and K are predicted from M=100%, L*, a*, and b*.

In S44, the prediction result is tested to check whether or not either of the predicted residual two colors, namely any one of Y and C in this case, exceeds 100% as in the previous case. If either of Y and C exceeds 100%, then the selected color is not the wanted color. In this case, in S45, K and amounts of residual two colors are predicted from L*a*b* under the assumption that the amount of color except K that has not been equalized, to 100% is equalized to 100%. Herein, Y, M, and K are predicted from C=100%, and L*a*b*.

Because there is the wanted color without exception, the residual two colors found in the third prediction result must be equal to or lower than 100%. However, either of them may exceed 100% in some cases due to an prediction error. Such a case is found in S46, and if either of them exceeds 100%, then the prediction value corresponding to the prediction case in which the smallest maximum YMC value is obtained out of the three prediction cases is regarded as the correct prediction value.

If neither of the predicted residual two colors exceeds 100% in the condition checking in S42, S44, and S47, or if the prediction value that is regarded as a correct value with consideration of the prediction error in S47 is selected, then the predicted K is K obtained when the wanted color is equalized to 100%. In S48, 0% is used if the K is negative, or 100% is used if K exceeds 100%, and as the result the minimum K is thereby calculated.

Figure 10:
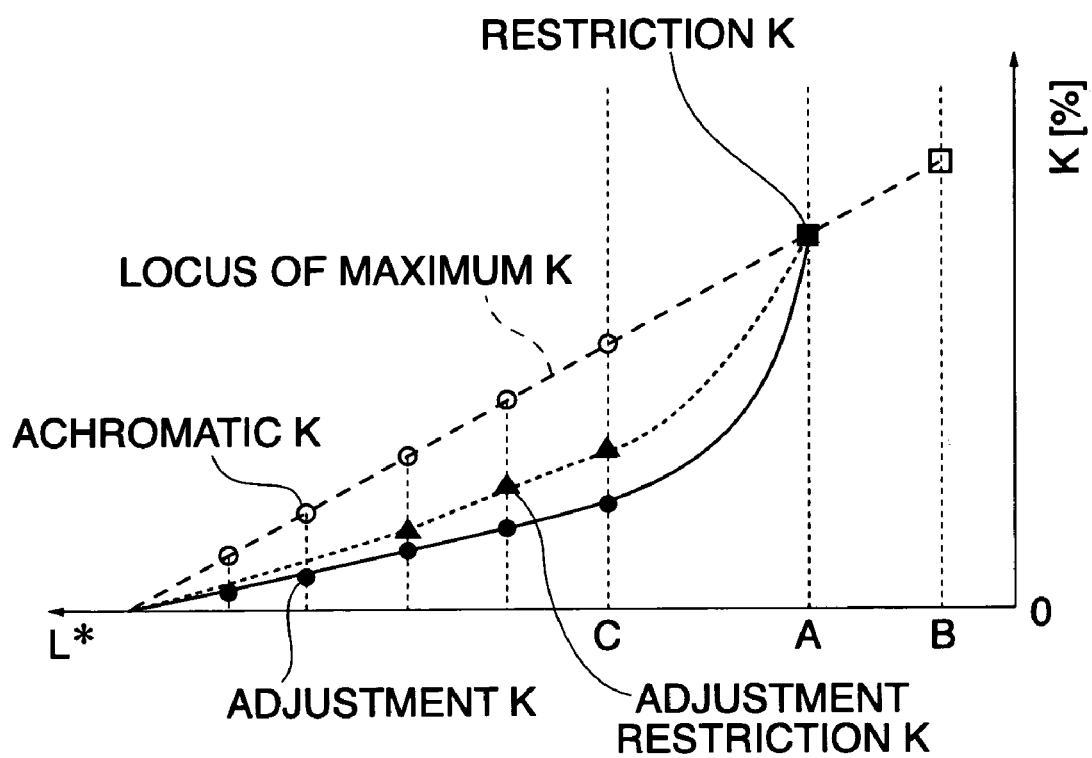
FIG. 10 is a graph showing an exemplary relation between the lightness and K in the second embodiment of the present invention.

Furthermore, most of the YMCK of the color gamut that is reproducible with four colors can be actually predicted by predicting YMC by use of the achromatic K clipped in the range from 0% to 100% described with respect to FIG. 10 and L*a*b*. As described with respect to FIG. 5 and FIG. 6, the search is necessary in the case where the maximum K that is not equal to the achromatic K is calculated, and as the result, a lot of time is consumed. To avoid such a problem, the clipped achromatic K may be used as the maximum K used in the process of the abovementioned binary search.

As described hereinabove, plural pairs of the L*a*b* on the four-color gamut periphery that satisfies the coverage restriction and the restriction K corresponding to the L*a*b* are generated.

The optimal K modeling unit 15 models between the L*a*b* and the optimal K from plural pairs of the L*a*b* and the corresponding adjustment K calculated by the adjustment K calculation unit 13 and from plural pairs of L*a*b* and the corresponding restriction K calculated by the restriction K calculation unit 14. A modeling method such as regression, neural net, or weighted average method may be used. As a matter of course, any method may be used as long as the method is usable to construct a model that is used to predict the optimal K from L*a*b*. Otherwise, various interpolation methods such as linear interpolation may be used without construction of an prediction model. In the present example, the method described in Japanese Published Unexamined Patent Application No. Hei 10-262157 is used. Therefore, the optimal K modeling unit 15 combines the plural pairs of L*a*b* and the corresponding adjustment K calculated by the adjustment K calculation unit 13 simply with plural pairs of L*a*b* and the corresponding K calculated by the restriction K calculation unit 14, and thereby generates the LAB-K model by plural pairs of L*a*b* and the corresponding optimal K.

Figure 7:
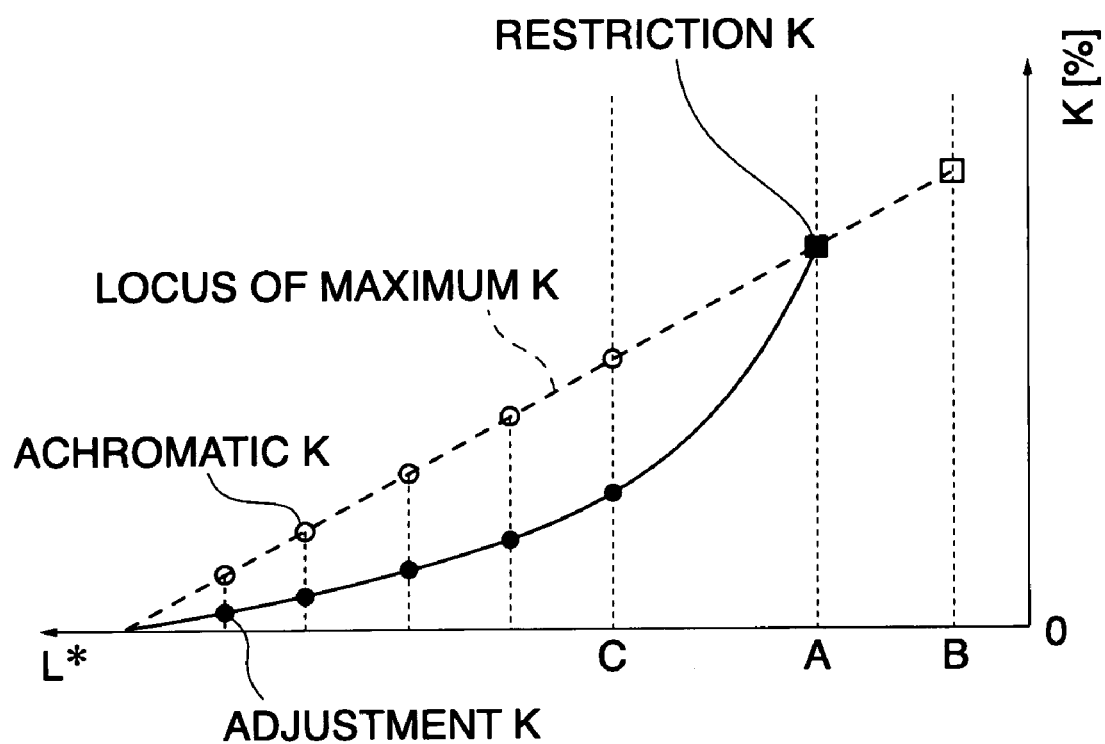
FIG. 7 is a graph showing an exemplary relation between the lightness and K in the first embodiment of the present invention.
Figure 14:
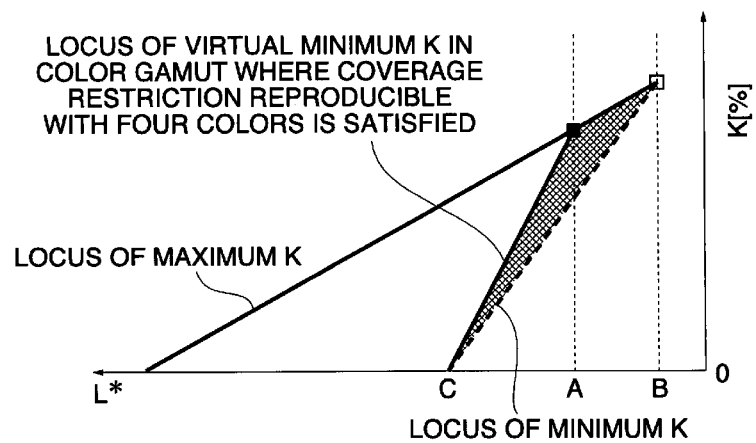
FIG. 14 is a graph showing an exemplary relation between the lightness and K in the conventional method.

FIG. 7 is a graph for showing an exemplary relation between the lightness and K in the first embodiment of the present invention. In FIG. 7, K of the color having a certain chroma and hue that is different in the lightness is shown as in the case shown in FIG. 14. The abscissa represents L* (lightness), and the ordinate represents the black amount (K). Herein, B represents the periphery of the color gamut that is reproducible with four colors, A represents the periphery of the color gamut that is reproducible with four colors and satisfies the coverage restriction, and C represents the periphery of the three-color gamut. The locus of the maximum K with respect to L* is shown with a broken line, the white circles on the locus show the achromatic K with respect to L* in the three-color gamut (L*≧C). Furthermore, the adjustment K that is obtained by multiplying the achromatic K by a proper K control parameter is shown with black circles, and an exemplary locus is shown with a solid line. For the out-color gamut (L*<C) that is reproducible with three colors, the restriction K with respect to L* that is reproducible with four colors including black and satisfies the coverage restriction is shown with a black square. The maximum K with respect to L* on the out-color gamut periphery (B) that is reproducible with four colors in the case where the coverage restriction is not taken into consideration is shown with a white square.

The optimal K modeling unit 15 modes the relation between L* shown with the solid line and K based on the adjustment K shown with the black circles and black square shown in FIG. 7 and the restriction K (and corresponding L*a*b*). The relation between L* and K is shown in FIG. 7 for the purpose of description, however, the relation between L*a*b* and K in the three-dimensional space is modeled as described hereinabove actually.

The optimal K determining unit 16 determines the optimal K from the input L*a*b* by use of the LAB-K model constructed by the optimal K modeling unit 15. In the present example, the optimal K is determined by predicting the optimal K from L*a*b* by use of the LAB-K model generated by the optimal K modeling unit 15.

As described hereinabove, the optimal K calculation unit 11 can predict the optimal K for the L*a*b* supplied from the MDLUT generation unit 18 based on the LAB-K model generated by the optimal K modeling unit 15 in the present example.

The YMCK signal calculation unit 17 predicts the YMC based on the YMCK-LAB model constructed by the YMCK modeling unit 12 by use of the L*a*b* supplied to the optimal K determining unit 16 and the optimal K calculated by the optimal K determining unit 16. In the present example, YMC is predicted from the optimal K corresponding to the L*a*b* supplied by use of the YMCK-LAB model generated by the YMCK modeling unit 12. As described hereinabove, the YMCK corresponding to the input L*a*b* can be determined.

In the example shown in FIG. 1, an example is shown in which the MDLUT is generated by use of the above-mentioned optimal K calculation unit 11 and YMCK signal calculation unit 17. The generated DLUT is a three-dimensional table in which each axis of the L*a*b* color space is divided and YMCK signal is correlated to the L*a*b* at the lattice point in the present example. When an arbitrary color signal is entered, a YMCK signal corresponding to the input color signal is calculated from the lattice point corresponding to the input color signal or the lattice point located near the point of the input color signal by means of, for example, interpolation, and the result is sent out as the output.

To generate such DLUT as described hereinabove, the DLUT lattice point signal generation unit 18 generates L*a*b* that is corresponding to the lattice point and supplies the L*a*b* to the optimal K determining unit 16. For example, under the condition that L* ranges from 0 to 100 and a* and b* range from −128 to 128, L*a*b* that are corresponding to $17^3$=4913 lattice points formed by dividing each axis by 16 are generated successively one by one, and L*a*b* is supplied to the optimal K determining unit 16. K determined by the optimal K determining unit 16 and the YMC that is predicted by the YMCK signal calculation unit 17 by use of K are correlated to the input L*a*b* as the lattice point data.

As described hereinabove, DLUT used for generating YMCK is generated from L*a*b*, the image data of L*a*b* or partial image can be transformed to the image data of YMCK or partial image by use of the DLUT.

The configuration having the arrangement including from the YMCK modeling unit 12 to the YMCK signal calculation unit 17 of the optimal K calculation unit 11 has been described in the form of one series of flow hereinabove, and the configuration used when the DLUT is generated has also been described. The sequential operation including from the operation of the YMCK modeling unit 12 to the operation of the optimal K modeling unit 15 may be carried out previously if the output device such as a color printer and the K control parameter to be set previously have been determined. In this case, the optimal K determining unit 16 and the YMCK signal calculation unit 17 may be operated. For example, when DLUT is generated, if the sequential processing up to the processing performed by the optimal K modeling unit 15 has been carried out, the configuration having the arrangement including from the YMCK modeling unit 12 to the optimal K modeling unit 15 is needless, and the L*a*b* of the lattice point generated by the DLUT lattice point signal generation unit 18 is supplied to the optimal K determining unit 16 and the YMCK signal may be acquired from the YMCK signal calculation unit 17.

Otherwise, because the coverage restriction is determined by an output device usually, the operation of the units, which include the YMCK modeling unit 12, the adjustment K calculation unit 13 that assumed the K control parameter to be 100%, the restriction K calculation unit 14, and the optimal K modeling unit 15, has been carried out previously when the output device is determined, and the K control parameter is applied only to the optimal K corresponding to the adjustment K out of the LAB-K model generated by the optimal K modeling unit 15 when setting of the K control parameter is determined. By applying the above-mentioned method, it is possible to design the optimal K that is suitable for the purpose with changing the K control parameter in a trial-and-error fashion.

Furthermore, the example in which the YMCK signal corresponding to L*a*b* of the lattice point of DLUT is acquired is described hereinabove, however, the present invention is by no means limited to this example. For example, the representative L*a*b* may be supplied to the optimal K determining unit 16 and the correlative relation between the representative L*a*b* and the YMCK signal acquired from the YMCK signal calculation unit 17 is obtained, and the coefficient used to transform the color of the color input image may be generated based on the correlative relation. The color transformation from arbitrary L*a*b* to YMCK signal can be carried out by use of the generated coefficient. Furthermore, it is also possible to acquire the YMCK signal from arbitrary L*a*b* input by direct use of the optimal K determining unit 16 and the YMCK signal calculation unit 17.

Figure 8:
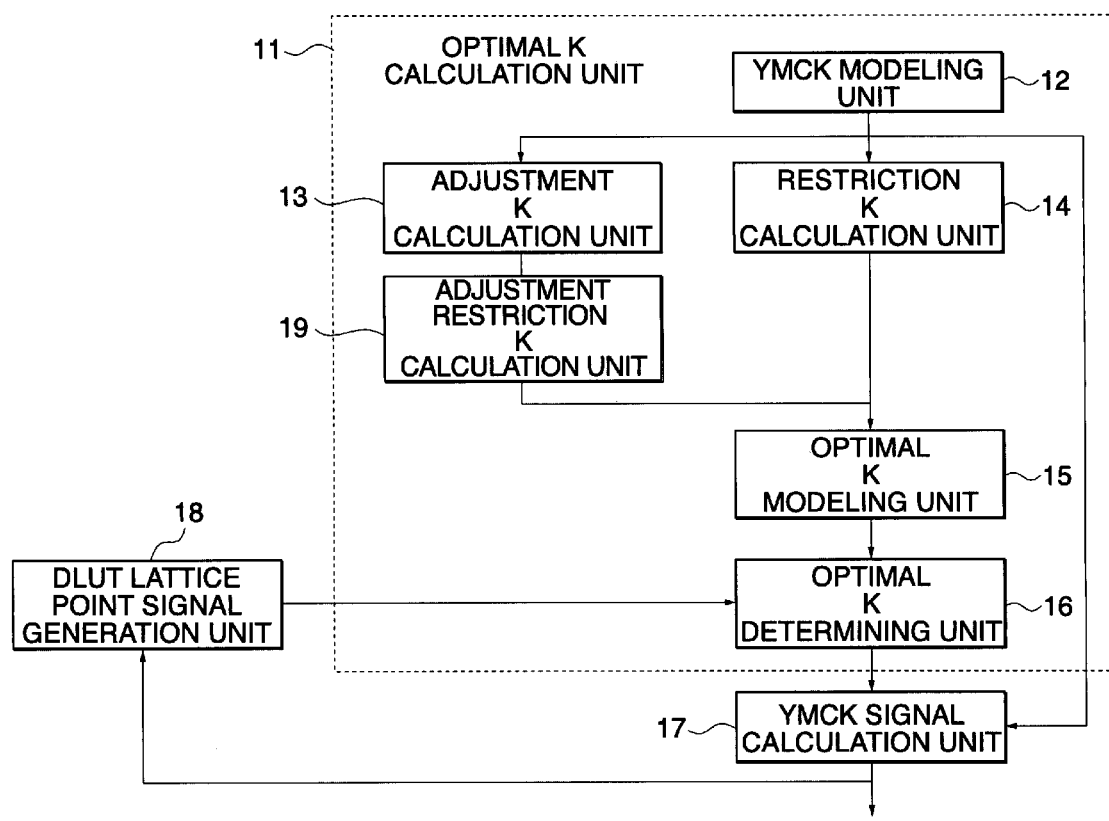
FIG. 8 is a block diagram illustrating the second embodiment of the present invention.

FIG. 8 is a block diagram illustrating the second embodiment of the present invention. The same components shown in FIG. 8 as shown in FIG. 1 are given the same characters, and the description is omitted. 19 denotes an adjustment restriction K calculation unit. In the abovementioned embodiment shown in FIG. 1, the adjustment K calculation unit 13 selects plural L*a*b* of the three-color gamut, calculates the achromatic K from the L*a*b*, and calculates the adjustment K by multiplying the achromatic K by the K control parameter that has been set previously correspondingly to the L*a*b*. In this case, because the selected L*a*b* belongs to the color gamut that is reproducible with three colors, K is determined on the assumption that the total color material amount is suppressed low by generating the YMCK by use of the adjustment K, and the total color material amount seldom exceeds the coverage restriction. A K determining method that should be used when the total color material amount likely exceeds the coverage restriction is shown in the abovementioned embodiment. In the second embodiment, it is assumed that the input color space is CIELAB (L*a*b*) color space and the four-color signal including the black component includes Y, M, C, and K. As a matter of course, the color space and the four-color signal are by no means limited to the abovementioned case as in the abovementioned embodiment, and the present embodiment may be applied to other color space such as CIELUV (L*u*v*) or RGB, and other four-color signal including the black component.

The second embodiment of the present invention shown in FIG. 8 has the same configuration as that of the abovementioned first embodiment excepting the adjustment restriction K calculation unit 19, and only the adjustment restriction K calculation unit 19 will be described herein under. In the second embodiment, the same modifications as described in the first embodiment may be employed.

In the case where the total color material amount of the YMCK generated by use of the adjustment K calculated by the adjustment K calculation unit 13 satisfies the coverage restriction, the adjustment restriction K calculation unit 19 calculates the adjustment restriction K by use of the adjustment K as the adjustment restriction K, on the other hand in the case where the total color material amount does not satisfy the coverage restriction, the adjustment restriction K calculation unit 19 calculates the adjustment restriction K by searching between the adjustment K and the achromatic K so that the total color material amount satisfies the coverage restriction. Alternatively, the adjustment restriction K has been obtained previously, whether or not the adjustment K is in a range between the adjustment restriction K and the achromatic K is checked, and if the coverage restriction is not satisfied with the adjustment K, then the adjustment restriction K is employed. Furthermore, it is not necessary that the total color material amount is checked and the adjustment restriction K is calculated in the case where the coverage restriction is not satisfied for all the L*a*b* that belongs to the color gamut that is reproducible with three colors selected by the adjustment K calculation unit 13, and, for example, only the L*a*b* on the periphery of the color gamut that is reproducible with three colors may be used, or one or plural L*a*b* in the color gamut may be used.

Figure 9:
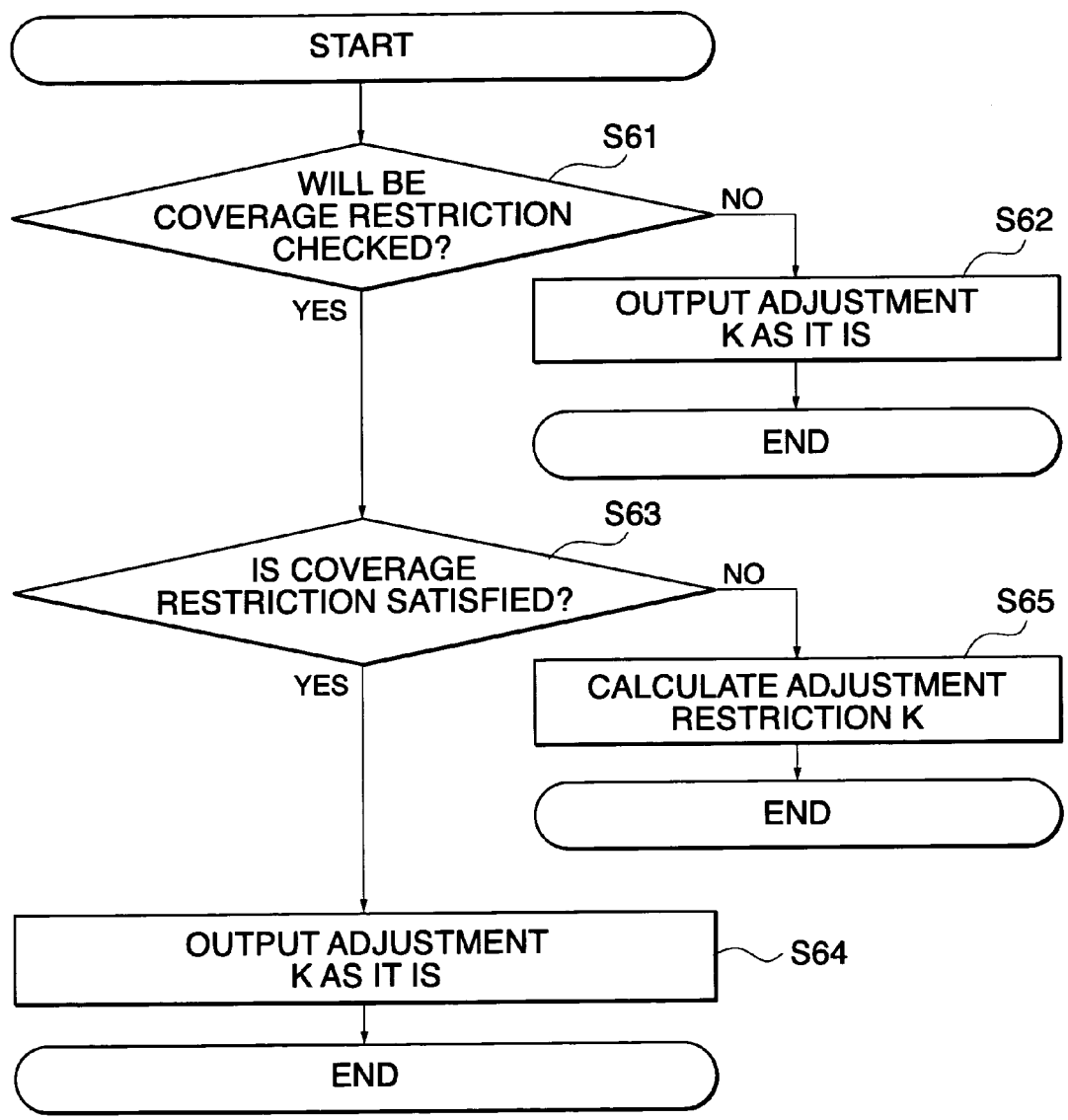
FIG. 9 is a flowchart for describing an exemplary operation in an adjustment restriction K calculation unit.

FIG. 9 is a flowchart for describing an exemplary operation in the adjustment restriction K calculation unit. When the adjustment K for the L*a*b* selected by the adjustment K calculation unit 13 is calculated, whether or not the check is to be carried out or not to see whether the total color material amount of the YMCK generated by use of the calculated adjustment K satisfies the coverage restriction is determined. For example, it is possible that only the L*a*b* on the periphery of the color gamut that is reproducible with three colors is checked or one or plural L*a*b* in the color gamut are checked. In the case where the L*a*b* selected by the adjustment K calculation unit 13 is not to be checked, the adjustment restriction K calculation unit 19 processes nothing substantially and sends out the adjustment K calculated by the adjustment K unit 13 as it is in S62.

In the case where the L*a*b* selected by the adjustment K calculation unit 13 is to be checked, further in S63, whether or not the total color material amount of the YMCK generated by use of the adjustment K calculated by the adjustment K calculation unit 13 satisfies the coverage restriction is checked. As the result, if the total color material amount satisfies the coverage restriction, the adjustment K calculated by the adjustment K calculation unit 13 is sent out as it is as the output in S64. If the coverage restriction is not satisfied with the adjustment K calculated by the adjustment K calculation unit 13, then, in S65, the adjustment restriction K is calculated by searching on a range between the adjustment K and the achromatic K so that the coverage restriction is satisfied, and the obtained result is sent out as the output.

FIG. 10 is a graph for describing an exemplary relation between the lightness and K in the second embodiment of the present invention. Herein, the case is described in which K that satisfies the coverage restriction is determined for all the L*a*b* selected by the adjustment K calculation unit 13. As in the abovementioned case shown in FIG. 7, K of the color having a certain chroma and hue at various brightness is shown, and the abscissa represents L* (brightness) and the ordinate represents the black amount (K). The respective meaning of A, B, periphery of C, broken line, solid line, white circle, black circle, black square, and white square is the same as the case described with respect to FIG. 7, and the adjustment restriction K calculated by the adjustment restriction K calculation unit 19 is shown with black triangles.

Whether the coverage restriction is satisfied or not is checked on all the L*a*b* selected by the adjustment K calculation unit 13, if the coverage is not satisfied for some L*a*b*, the adjustment restriction K that satisfies the coverage restriction is calculated for these L*a*b*. In FIG. 10, it is shown that the total color material amount does not satisfy the coverage restriction with the adjustment K for the selected color for which the adjustment K and the adjustment restriction K are shown with the same brightness and the adjustment restriction K calculation unit 19 calculates the adjustment restriction K. Furthermore, it is shown that the coverage restriction is satisfied with the adjustment K calculated by the adjustment K calculation unit 13 for the selected color for which the adjustment restriction K corresponding to the adjustment K is not shown and it is sent out as the output.

The optimal K modeling unit 15 predicts the whole K by use of the adjustment restriction K calculated by the adjustment restriction K calculation unit 19 as described hereinabove (and the adjustment K that has been used successively to satisfy the coverage restriction and sent out as it is as the output) and the restriction K calculated by the restriction K calculation unit 14, and as the result K that satisfies the coverage restriction as shown with a dotted line in FIG. 10 is obtained.

Figure 11:
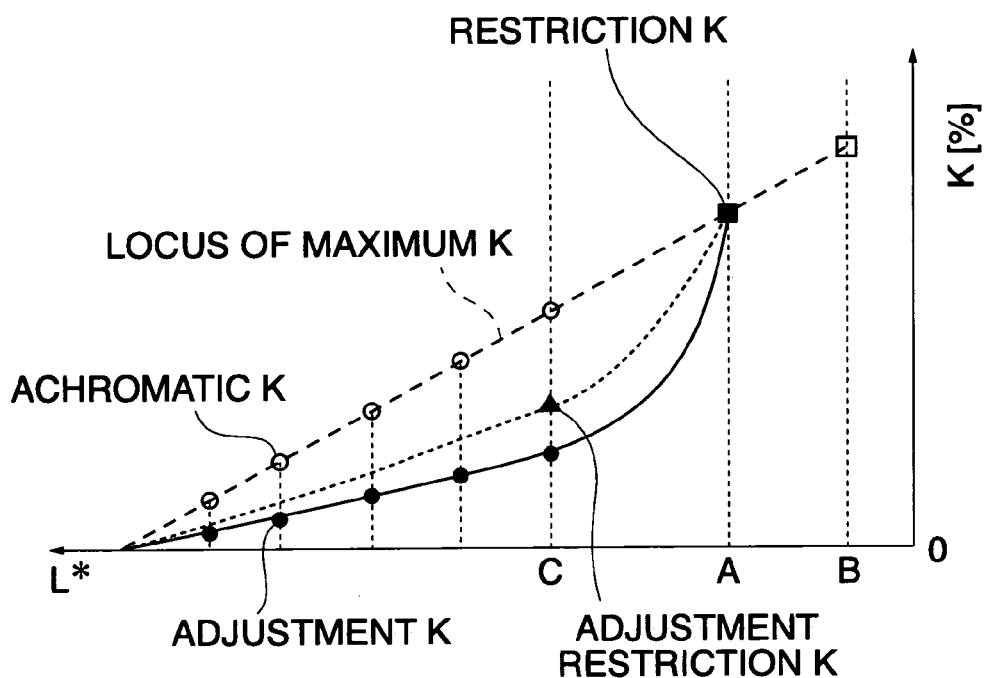
FIG. 11 is a graph showing another exemplary relation between the lightness and K in the second embodiment of the present invention.

FIG. 11 is a graph for describing an exemplary another relation between the lightness and K in the second embodiment of the present invention. Herein, the case in which K that satisfies the coverage restriction for all the L*a*b* on the periphery on the lower lightness where the total color material amount is likely maximized out of the L*a*b* selected by the adjustment K calculation unit 13 is determined is shown. The adjustment K calculated by the adjustment K calculation unit 13 is sent out as the output as it is for the non-periphery. Also in the present example, K of the color having a certain chroma and hue at various lightness as in the case shown with respect to FIG. 7 and FIG. 10 is shown, and the abscissa represents L* (lightness) and the ordinate represents the black amount (K). The respective meaning of A, B, periphery of C, broken line, solid line, white circle, black circle, black square, and white square is the same as that described with respect to FIG. 7 and FIG. 10, and the adjustment restriction K calculated by the adjustment restriction K calculation unit 19 is shown with a black triangle.

In this case, whether the total color material amount, of the YMCK generated by use of the adjustment K calculated by the adjustment K calculation unit 13 satisfies the coverage restriction or not is checked only on the periphery C of the three-color gamut, and the case that the total color material amount does not satisfy the coverage restriction and the adjustment restriction K is calculated is shown. In the case of the adjustment K for other L*a*b* selected by means of the adjustment K calculation unit 13, it is sent out as it is as the output regardless of the satisfaction of the coverage restriction.

The optimal K modeling unit 15 predicts any K by use of the adjustment restriction K calculated by the adjustment K calculation unit 19 as described hereinabove, the adjustment K that has been sent out as it is as the output, and the restriction K calculated by the adjustment K calculation unit 14, and as the result K that satisfies the coverage restriction as shown with a dotted line in FIG. 11 is obtained.

In the case where the adjustment restriction K is calculated only for the L*a*b* on the periphery of the three-color gamut as described hereinabove, the L*a*b* that is the representative point near the L*a*b* on the periphery is excluded from the K prediction target, or the number of necessary data in increased to weight, and as the result the more desirable K can be predicted.

In the case where K that satisfies the coverage restriction for all the L*a*b* selected in the three-color gamut is generated as shown in FIG. 10, K can be surely predicted. However, because it is required that the coverage restriction must be checked and the adjustment restriction K must be calculated for many L*a*b*, a lot of calculation time is necessary. On the other hand, the method in which K that satisfies coverage restriction is generated only for the L*a*b* on the periphery of the three-color gamut as described with respect to FIG. 11 may be employed to shorten the calculation time, and this method is practical. In the case where higher accuracy is necessary, the coverage restriction is checked and the adjustment restriction K is calculated for arbitrary L*a*b* near the periphery of the three-color gamut.

Figure 12:
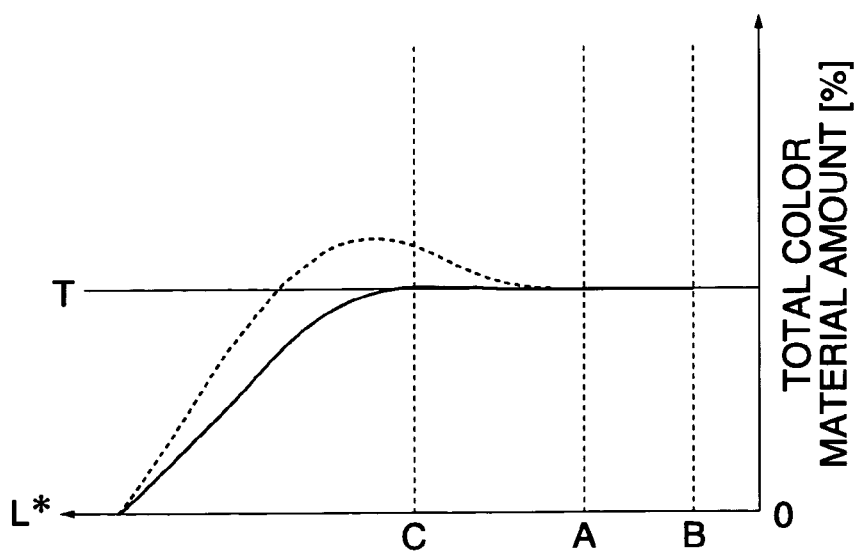
FIG. 12 is a graph showing an exemplary relation between the lightness and the total color material amount in the second embodiment of the present invention.

FIG. 12 is a graph for describing an exemplary relation between the lightness and the total color material amount in the second embodiment of the present invention. The total color material amount of the color having a certain chroma and hue at various different lightness is shown as in the case described with respect to FIG. 7, FIG. 10 and FIG. 11, and the abscissa represents L* (lightness) and the ordinate represents the total color material amount. The meaning of the periphery A, B, and C is the same as that shown in FIG.

7, FIG. 10, and FIG. 11. T represents the coverage restriction value. The dotted line shows the total color material amount of the case where the adjustment restriction calculation unit 19 is not provided, and the solid line shows the total color material amount of the case where the adjustment restriction K calculation unit 19 is provided.

As it is obvious in FIG. 12, the total color material amount can exceeds the coverage restriction value T as shown with the broken line in the case where the adjustment K calculated by the adjustment K calculation unit 13 is used as it is. Even in such a case, the adjustment restriction K calculation unit 19 calculates the adjustment restriction K to thereby calculate K so that the coverage restriction is satisfied over the entire color gamut as shown with the solid line.

The abovementioned embodiments can be implemented by use of a computer program. In this case, the program and the data used in the program may be stored in a computer-readable recording medium. Furthermore, the abovementioned DLUT data and data such as a coefficient used for color transformation can be stored in a computer-readable recording medium. The recording medium causes change of energy such as magnetic energy, optical energy, or electric energy corresponding to the description content of the program to the reading device of the hardware resource of the computer and transmits the description content to a reading device in a signal format corresponding to the energy. For example, a magnetic disk, an optical disk, a CD-ROM, a memory card, and a built-in memory of a computer are exemplified as the recording medium.

Figure 13:
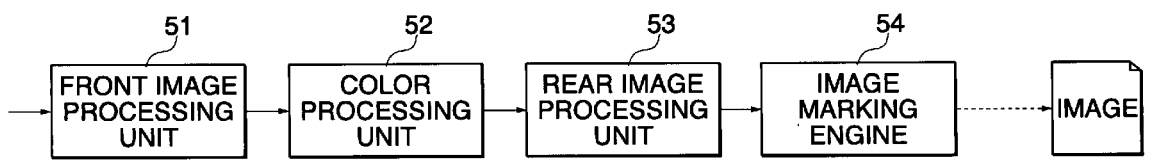
FIG. 13 is a block diagram illustrating an embodiment of an image marking apparatus of the present invention.

FIG. 13 is a block diagram illustrating an embodiment of an image marking device of the present invention. In FIG. 13, 51 denotes a front end image processing unit, 52 denotes a color processing unit, 53 denotes a rear end image processing unit, and 54 denotes an image marking engine. The front end image processing unit 51 subjects various image processing to the input image data prior to the color processing performed by means of the color processing unit 52. Furthermore, the rear end image processing unit 53 subjects various image processing to the image data that has been subjected to the color processing. The front end image processing unit 51 or the rear end image processing unit 53 may not be provided in some cases.

The image marking engine 54 prints an image by use of color materials of four colors including black based on the image data received from the rear end image processing unit 53 (or color processing unit 52).

The color processing unit 52 having the DLUT generated described hereinabove transforms the image data that has been subjected to the image processing by the front end image processing 51 (or input image data) to the four-color signal including the black component to be used in the image marking engine 54. The DLUT in the color processing unit 52 is generated by use of the model corresponding to the image marking engine 54, and K is determined with consideration of the coverage restriction. Therefore, the color transformation is performed so that a high quality image is marked by the image marking engine 54, and the image data of four colors that satisfies the coverage restriction is generated. Because the image marking engine 54 prints an image based on such image data, the unwanted color gamut compression duet to over coverage restriction does not occur, and excellent color reproducibility is attained.

The coefficient used for color transformation is generated as described hereinabove in addition to the DLUT in the color processing unit 52, the color transformation may be performed by use of the coefficient. In any case of the color transformation with the DLUT and the color transformation with the coefficient, the input side color space is by no means limited to the L*a*b* color space, but RGB, L*u*v*, XYZ, or other color spaces may be used as the input side color space. The output side color space is the color space of four colors including black corresponding to the image marking engine 54.

As it is obvious from the above-mentioned description, according to the present invention, the optimal K is determined with consideration of the coverage restriction while K depending on the purpose is controllable as in the conventional art. Thereby, the color gamut that is reproducible with four colors and satisfies the coverage restriction is used effectively, the unwanted color gamut compression is prevented, and the input color signal can be transformed to the four-color signal including the black component that reproduces the input color signal with high accuracy. Furthermore, the color reproducibility is improved by use of the four-color signal transformed as described hereinabove or by use of the MDLUT obtained from correlation between the transformed four-color signal and the input color signal, or by use of the transformation coefficient.

The entire disclosure of Japanese Patent Applications Nos. 2000-120432 filed on Apr. 21, 2000 and 2001-34867 filed on Feb. 13, 2001 each of which includes specification, claims, drawings and abstract is incorporated herein by reference in its entirety.

What is claimed is:

1. A color processing method used for transforming an arbitrary input color signal in an input color space to a four-color signal including a black component, the method comprising the steps of:
   generating a first set of plural optimal K corresponding to plural representative color signals of the input color signal that belong to a partial color space reproducible with three colors and a second set of plural optimal K corresponding to plural representative color signals of the input color signal that belong to a curved plane being reproducible with four colors including black and satisfying a coverage restriction;
   predicting an optimal K corresponding to the input color signal in the input color space based on a model generated from plural pairs of the representative color signals in the input color space and the first or second set of plural optimal K; and
   predicting amounts of three colors except black from the predicted optimal K and the input color signal to calculate the four-color signal including the black component,
   wherein K is an amount of the black component.

2. The color processing method according to claim 1, wherein the first set of plural optimal K is calculated by multiplying an achromatic K corresponding to the representative color signal by a K control parameter corresponding to the representative color signal.

3. The color processing method according to claim 2, wherein the K control parameter depends on at least any one of lightness, chroma, and hue calculated from the representative color signal.

4. The color processing method according to claim 2, wherein an achromatic K is calculated by repeating prediction of three colors except black, under the condition that one of the three colors is equalized to 0% successively, until both two colors out of the three predicted from the representative color signals have a non-negative value and thereafter by clipping the predicted K between 0% and 100% when the predicted two colors have a non-negative value.

5. The color processing method according to claim 4, wherein the three colors except black are predicted from the representative color signals under the condition that the one of three colors is equalized to 0 in the order of likeliness of an unwanted color.

6. The color processing method according to claim 1, wherein the curved plane corresponding to the second set of plural optimal K is an outermost periphery surface of the color gamut that is reproducible with four colors including black and satisfies the coverage restriction.

7. The color processing method according to claim 6, wherein representative color signals in the input color space on the outermost periphery surface of the color gamut that is reproducible with four colors including black and satisfies the coverage restriction is calculated by searching on a semi-line that extends in the high chroma direction or the low lightness direction, or the high chroma and low lightness direction from the starting point of the color signal in the input color space inside the color gamut that is reproducible with three colors or on the periphery of the color gamut that is reproducible with three colors.

8. A color processing apparatus used for generating a four-color signal including a black component from an arbitrary input color signal in a input color space, the apparatus comprising:
   a color transformation part that transforms the input color signal to the four-color signal based on a coefficient obtained in accordance with correlative relation between plural four-color signals obtained by the color processing method according to claim 1.

9. The color processing method according to claim 1, wherein the partial color space is a color gamut that is reproducible with three colors except black.

10. The color processing method according to claim 1, wherein the partial color space is a color gamut that is reproducible with a sum of the all arbitrary combinations of three colors including black.

11. The color processing method according to claim 1, wherein the second set of plural optimal K corresponding to the representative color signals that belong to the curved plane is the maximum K that maximizes K out of one or more four-color signals that reproduce the representative color signals.

12. The color processing method according to claim 11, wherein the maximum K is an achromatic K if the representative color signal is reproducible with the four-color signal including the achromatic K clipped between 0% and 100%, and on the other hand if the representative color signal is not reproducible with the four-color signal including an achromatic K clipped between 0% and 100%, the maximum K is obtained by calculating a minimum K from the representative color signals and thereafter by searching between the minimum K and 100%.

13. The color processing method according to claim 12, wherein the minimum K is calculated by repeating prediction of the three colors except black, under the condition that one of the three colors is equalized to 100% successively, until both two colors out of the three predicted from the representative color signals have a value equal to 100% or smaller, and thereafter by clipping the predicted K between 0% and 100% when the predicted two colors except black have a value equal to 100% or smaller.

14. The color processing method according to claim 1, wherein the second set of plural optimal K corresponding to the representative color signals that belong to the curved plane is K obtained by clipping an achromatic K corresponding to the representative color signal between 0% and 100%.

15. The color processing method according to claim 1, wherein plural four-color signals are correlated to the input color signals to generate a multi-dimensional look up table (MDLUT), and an arbitrary color signal in the input color space is transformed to the four-color signal by use of the MDLUT.

16. A recording medium which stores the MDLUT generated by the color processing method according to claim 15.

17. The color processing method according to claim 1, wherein a coefficient that is used for color transformation of an input color image is generated from correlative relation between the input color signals and the four-color signals corresponding to the input color signals, and an arbitrary color signal in the input color space is transformed to a four-color signal by use of the coefficient.

18. A recording medium which stores the coefficient generated by the color processing method according to claim 17.

19. The color processing method according to claim 1, wherein the first set of plural optimal K includes a third set of plural optimal K that satisfy the coverage restriction corresponding to plural representative color signals that belong to a periphery of the partial color space.

20. The color processing method according to claim 19, wherein the first set of plural optimal K includes a fourth set of plural optimal K that satisfy the coverage restriction corresponding to additional one or more representative color signals that belong to the partial color space.

21. The color processing method according to claim 20, wherein, in the case where K that is calculated by multiplying an achromatic K corresponding to the representative color signal by a K control parameter corresponding to the representative color signal satisfies the coverage restriction, the calculated K is used as the first set of plural optimal K, and on the other hand, in the case where K that is calculated by multiplying an achromatic K corresponding to the representative color signal by a K control parameter corresponding to the representative color signal does not satisfy the coverage restriction, IC that is calculated by searching between the achromatic K corresponding to the representative color signal and K that is calculated by multiplying the achromatic K corresponding to the representative color signals by the K control parameter corresponding to the representative color signal is used as the first set of plural optimal K.

22. The color processing method according to claim 19, wherein, in the case where K that is calculated by multiplying an achromatic K corresponding to the representative color signal by a K control parameter corresponding to the representative color signal satisfies the coverage restriction, the calculated K is used as the third set of plural optimal K, and on the other hand, in the case where K that is calculated by multiplying an achromatic K corresponding to the representative color signal by a K control parameter corresponding to the representative color signal does not satisfy the coverage restriction, K that is calculated by searching between the achromatic K corresponding to the representative color signal and K that is calculated by multiplying an achromatic K corresponding to the representative color signal by the K control parameter corresponding to the representative color signal is used as the third set of plural optimal K.

23. A color processing method used for generating a four-color signal including a black component based on an input color signal, the method comprising the steps of:
   repeating prediction of amounts of three colors except black, under the condition that one of the three colors is equalized to 0% successively, until both two colors out of the three predicted from representative color signals of the input color signal have a non-negative value;

clipping a predicted K between 0% and 100% when the predicted two colors have a non-negative value; and calculating an achromatic K, wherein K is an amount of the black component.

24. A color processing method used for generating a four-color signal including a black component based on an input color signal, comprising the steps of:

assuming that a maximum K is an achromatic K if representative color signal of the input color signal is reproducible with the four-color signal including the achromatic K clipped between 0% and 100%; and obtaining the maximum K by calculating a minimum K from the representative color signals and thereafter by searching between the minimum K and 100%, if the representative color signal is not reproducible with the four-color signal including the achromatic K clipped between 0% and 100%, wherein K is an amount of the black component.

25. The color processing method according to claim 24, wherein the minimum K is calculated by repeating prediction of amounts of three colors except black, under the condition that one of the three colors is equalized to 100% successively, until both two colors out of the three predicted from the representative signals have a value equal to 100% or smaller, and thereafter by clipping a predicted K between 0% and 100% when the predicted two colors have a value equal to 100% or smaller.

26. A computer-readable recording medium that stores a program that makes a computer execute the steps of:

generating a first set of plural optimal K corresponding to plural representative color signals of the input color signal that belong to a partial color space reproducible with three colors and a second set of plural optimal K corresponding to plural representative color signals of the input color signal that belong to a curved plane being reproducible with four colors including black and satisfying a coverage restriction;

predicting an optimal K corresponding to the input color signal in the input color space based on a model generated from plural pairs of the representative color signals in the input color space and the first or second set of plural optimal K;

and predicting amounts of three colors except black from the predicted optimal K and the input color signal to calculate the four-color signal including the black component, wherein K is an amount of the black component.

27. A color processing apparatus used for generating a four-color signal including a black component from an arbitrary input color signal in an input color space, the apparatus comprising:

an optimal K calculation part that predicts an optimal K corresponding to the color signal in the input color space based on a model generated from plural pairs of a representative color signal of the input color signal in the input color space and the optimal K corresponding to the representative color signal; and a four-color signal calculation part that predicts amounts of three colors except black from the optimal K predicted by the optimal K calculation part and the input color signal to thereby calculate a four-color signal including the black component, wherein the optimal K calculation part uses plural representative color signals that belong to a partial color space that is a color gamut reproducible with three colors and plural representative color signals that belong to the curved plane that is reproducible with four colors including black and satisfies the coverage restriction, and wherein K is an amount of the black component.

28. The color processing apparatus according to claim 27, wherein the plural pairs used by the optimal K calculation part include plural pairs of the representative color signal that belongs to the periphery of the partial color space and the optimal K that satisfies the coverage restriction corresponding to the representative color signal.

29. The color processing apparatus according to claim 28, wherein the plural pairs used by the optimal K calculation part additionally include one or more pairs of the representative color signal and the optimal K that satisfies the coverage restriction corresponding to the representative color signal.

30. An image marking apparatus used to print an image, comprising:

the color processing apparatus according to claim 27 that transforms the input color signal for the image to a four-color signal including a black component; and an image marking part that prints the image according to the four-color signal transformed by the color processing apparatus.

31. A color processing apparatus used for generating a four-color signal including a black component from an arbitrary input color signal in a input color space, the apparatus comprising:

a multi-dimensional look up table that stores plural four-color signals obtained by the color processing method according to claim 1 as lattice point data corresponding to the input color signal; and a color transformation part that generates a four-color signal by use of the multi-dimensional look up table.

32. A color processing method used for transforming an arbitrary input color signal in an input color space to a four-color signal including a black component, the method comprising the steps of:

generating a first set of plural optimal K that satisfy the coverage restriction corresponding to plural representative color signals of the input color signal that belong to a partial color space reproducible with three colors and a second set of plural optimal K corresponding to plural representative color signals of the input color signal that belong to a curved plane being reproducible with four colors including black and satisfying a coverage restriction;

predicting an optimal K corresponding to the input color signal in the input color space based on a model generated from plural pairs of the representative color signals in the input color space and the first or second set of plural optimal K; and predicting amounts of three colors except black from the predicted optimal K and the input color signal to calculate the four-color signal including the black component, wherein K is an amount of the black component.

33. A color processing apparatus used for generating a four-color signal including a black component, from an arbitrary input color signal in a input color space, the apparatus comprising:

an optimal K calculation part that predicts an optimal K corresponding to the input color signal in the input color space based on a model generated from plural pairs of a representative color signal in the input color space and an optimal K corresponding to the representative color signal; and a four-color signal calculation part that predicts amounts of three colors except black from the optimal K predicted by the optimal K calculation part and the input color signal to thereby calculate a four-color signal including the black component, wherein the optimal, K calculation part uses plural representative color signals that belong to a partial color space that is a color gamut reproducible with three colors and satisfies the coverage restriction, and plural representative color signals that belong to the curved plane that is reproducible with four colors including black and satisfies the coverage restriction.

* * * * *